(12) United States Patent
White et al.

(10) Patent No.: US 11,797,341 B2
(45) Date of Patent: Oct. 24, 2023

(54) SYSTEM AND METHOD FOR PERFORMING REMEDIATION ACTION DURING OPERATION ANALYSIS

(71) Applicant: Dell Products L.P., Hopkinton, MA (US)

(72) Inventors: Joseph LaSalle White, San Jose, CA (US); William Price Dawkins, Lakeway, TX (US); Jimmy Doyle Pike, Georgetown, TX (US); Mukund P. Khatri, Austin, TX (US); Elie Antoun Jreij, Pflugerville, TX (US); Gaurav Chawla, Austin, TX (US); John S. Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 17/160,579

(22) Filed: Jan. 28, 2021

(65) Prior Publication Data
US 2022/0237036 A1    Jul. 28, 2022

(51) Int. Cl.
*G06F 9/50* (2006.01)

(52) U.S. Cl.
CPC ............ *G06F 9/5011* (2013.01); *G06F 9/505* (2013.01); *G06F 9/5038* (2013.01); *G06F 9/5044* (2013.01)

(58) Field of Classification Search
None
See application file for complete search history.

(56) References Cited

U.S. PATENT DOCUMENTS

| | | |
|---|---|---|
| 7,478,117 B1 | 1/2009 | Lamb et al. |
| 7,606,892 B2 | 10/2009 | Piet et al. |
| 7,620,984 B2 | 11/2009 | Kallahalla |
| 8,095,929 B1 | 1/2012 | Ji et al. |
| 8,276,140 B1 | 9/2012 | Beda, III et al. |
| 8,285,747 B1 | 10/2012 | English |
| 8,306,948 B2 | 11/2012 | Chou |
| 8,499,066 B1 | 7/2013 | Zhang et al. |
| 8,589,659 B1 | 11/2013 | Shapiro |

(Continued)

OTHER PUBLICATIONS

Mohammadi et al, "Towards an End-to-End Architecture for Runtime Data Protection in the Cloud", 2018 44th Euromicro Conference on Software Engineering and Advanced Applications (SEAA), IEEE, pp. 514-518. (Year: 2018).

(Continued)

*Primary Examiner* — Eric C Wai
(74) *Attorney, Agent, or Firm* — Chamberlain, Hrdlicka, White, Williams, & Aughtry

(57) ABSTRACT

An information handling system for obtaining composed information handling systems includes resource set components and a system control processor. The system control processor makes an identification, based on monitoring of a resource set component of the resource set components, of an operation event; in response to the identification: makes a determination that the operation event is not immediately remediable based on the monitoring of the resource set component; in response to the determination: modifies the monitoring of the resource set component to obtain refined operation data for the resource set component; and performs an action set, based on the refined operation data, to modify operation of the resource set component.

11 Claims, 12 Drawing Sheets

(56) References Cited

U.S. PATENT DOCUMENTS

| | | | |
|---|---|---|---|
| 8,606,920 B1 | 12/2013 | Gupta et al. |
| 8,751,546 B1 | 6/2014 | Grieve |
| 8,997,242 B2 | 3/2015 | Chen |
| 9,104,844 B2 | 8/2015 | Fang |
| 9,105,178 B2 | 8/2015 | Carlson |
| 9,245,096 B2 | 1/2016 | Abuelsaad |
| 9,413,819 B1 | 8/2016 | Berg et al. |
| 9,529,689 B2 | 12/2016 | Ferris et al. |
| 9,569,598 B2 | 2/2017 | Abuelsaad |
| 9,600,553 B1 | 3/2017 | Nigade et al. |
| 9,613,147 B2 | 4/2017 | Carlson |
| 9,678,977 B1 | 6/2017 | Aronovich |
| 9,959,140 B2 | 5/2018 | Jackson |
| 10,097,438 B2 | 10/2018 | Ferris et al. |
| 10,348,574 B2 | 7/2019 | Kulkarni |
| 10,382,279 B2 | 8/2019 | Roese |
| 10,601,903 B2 | 3/2020 | Bivens |
| 10,628,225 B2 | 4/2020 | Yamato |
| 10,756,990 B1 | 8/2020 | Chakkassery Vidyadharan et al. |
| 10,782,882 B1 | 9/2020 | Wu |
| 10,795,856 B1 | 10/2020 | Smith et al. |
| 10,848,408 B2 * | 11/2020 | Uriel | H04L 43/16 |
| 10,909,283 B1 | 2/2021 | Wang et al. |
| 10,994,198 B1 | 5/2021 | Byskal et al. |
| 11,119,739 B1 | 9/2021 | Allen et al. |
| 11,134,013 B1 | 9/2021 | Allen et al. |
| 11,221,886 B2 | 1/2022 | Bivens et al. |
| 11,537,421 B1 | 12/2022 | Brooker et al. |
| 2003/0028642 A1 | 2/2003 | Agarwal et al. |
| 2003/0061262 A1 | 3/2003 | Hahn et al. |
| 2003/0233427 A1 | 12/2003 | Taguchi |
| 2004/0257998 A1 | 12/2004 | Chu et al. |
| 2006/0082222 A1 | 4/2006 | Pincu et al. |
| 2006/0230407 A1 | 10/2006 | Rosu et al. |
| 2006/0236100 A1 | 10/2006 | Baskaran et al. |
| 2008/0052480 A1 | 2/2008 | Satoyama et al. |
| 2008/0313476 A1 | 12/2008 | Hansen |
| 2009/0199193 A1 | 8/2009 | Jackson |
| 2009/0282404 A1 | 11/2009 | Khandekar et al. |
| 2010/0217865 A1 | 8/2010 | Ferris |
| 2011/0055378 A1 | 3/2011 | Ferris et al. |
| 2011/0099147 A1 | 4/2011 | Mcalister et al. |
| 2011/0154500 A1 | 6/2011 | Sahita et al. |
| 2011/0307570 A1 | 12/2011 | Speks |
| 2012/0047328 A1 | 2/2012 | Williams et al. |
| 2012/0222084 A1 | 8/2012 | Beaty et al. |
| 2013/0007710 A1 | 1/2013 | Vedula et al. |
| 2013/0311434 A1 | 11/2013 | Jones |
| 2013/0332901 A1 | 12/2013 | Berg et al. |
| 2013/0346718 A1 | 12/2013 | Meshchaninov et al. |
| 2014/0007097 A1 | 1/2014 | Chin et al. |
| 2014/0149635 A1 | 5/2014 | Bacher et al. |
| 2014/0165063 A1 | 6/2014 | Shiva et al. |
| 2014/0223233 A1 | 8/2014 | Heyrman et al. |
| 2014/0279884 A1 | 9/2014 | Dantkale et al. |
| 2014/0282820 A1 | 9/2014 | Walton et al. |
| 2014/0359356 A1 | 12/2014 | Aoki |
| 2015/0106165 A1 | 4/2015 | Rai et al. |
| 2015/0220455 A1 | 8/2015 | Chen et al. |
| 2015/0317173 A1 | 11/2015 | Anglin |
| 2015/0381426 A1 | 12/2015 | Roese et al. |
| 2016/0062441 A1 | 3/2016 | Chou et al. |
| 2016/0180087 A1 | 6/2016 | Edwards et al. |
| 2016/0224903 A1 | 8/2016 | Talathi et al. |
| 2016/0259665 A1 | 9/2016 | Gaurav et al. |
| 2017/0034012 A1 | 2/2017 | Douglas et al. |
| 2017/0041184 A1 | 2/2017 | Broz et al. |
| 2017/0048200 A1 | 2/2017 | Chastain |
| 2017/0097851 A1 | 4/2017 | Chen |
| 2017/0118247 A1 | 4/2017 | Hussain |
| 2017/0195201 A1 | 7/2017 | Mueller et al. |
| 2017/0201574 A1 | 7/2017 | Luo |
| 2018/0024964 A1 | 1/2018 | Mao |
| 2018/0063145 A1 | 3/2018 | Cayton et al. |
| 2019/0065061 A1 | 2/2019 | Kim et al. |
| 2019/0065256 A1 | 2/2019 | Hamilton et al. |
| 2019/0079837 A1 | 3/2019 | Agarwal et al. |
| 2019/0164087 A1 | 5/2019 | Ghibril et al. |
| 2019/0188014 A1 | 6/2019 | Easterling et al. |
| 2019/0190778 A1 | 6/2019 | Easterling et al. |
| 2019/0205180 A1 | 7/2019 | Macha et al. |
| 2019/0227616 A1 | 7/2019 | Jenne et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1 | 12/2019 | Bernat |
| 2019/0384648 A1 | 12/2019 | Wiggers et al. |
| 2019/0386902 A1 | 12/2019 | Mueller et al. |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0034528 A1 | 1/2020 | Yang et al. |
| 2020/0044966 A1 | 2/2020 | Krishnan et al. |
| 2020/0065254 A1 | 2/2020 | Cao et al. |
| 2020/0097358 A1 | 3/2020 | Mahindru et al. |
| 2020/0174949 A1 | 6/2020 | Ramasamy et al. |
| 2020/0218561 A1 | 7/2020 | Lal et al. |
| 2020/0233582 A1 | 7/2020 | Chen et al. |
| 2020/0293375 A1 | 9/2020 | Klein |
| 2020/0341786 A1 | 10/2020 | Soryal |
| 2020/0341798 A1 | 10/2020 | Duleba |
| 2020/0351221 A1 | 11/2020 | Subramani et al. |
| 2020/0356200 A1 | 11/2020 | Blanco et al. |
| 2020/0358714 A1 | 11/2020 | Singleton, IV et al. |
| 2021/0019062 A1 | 1/2021 | Fessel |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1 | 4/2021 | Cui et al. |
| 2021/0117441 A1 | 4/2021 | Patel et al. |
| 2021/0152659 A1 | 5/2021 | Cai et al. |
| 2021/0224093 A1 | 7/2021 | Fu et al. |
| 2021/0367901 A1 | 11/2021 | Singh et al. |
| 2021/0397494 A1 | 12/2021 | Graham |
| 2022/0179701 A1 | 6/2022 | Saad et al. |
| 2022/0197773 A1 | 6/2022 | Butler et al. |
| 2023/0026690 A1 | 1/2023 | Dawkins et al. |
| 2023/0033296 A1 | 2/2023 | Shetty et al. |

OTHER PUBLICATIONS

Chunlin, Li et al., "Hybrid Cloud Adaptive Scheduling Strategy for Heterogeneous Workloads", Journal of Grid Computing 17, pp. 419-446, (Year: 2019) (28 pages).

International Search Report and Written Opinion of the International Searching Authority dated Oct. 21, 2021, issued in corresponding PCT Application No. PCT/US2021/029708 (12 pages).

International Search Report and Written Opinion of the International Searching Authority dated Aug. 19, 2021, issued in corresponding PCT Application No. PCT/US2021/029702 (13 pages).

International Search Report and Written Opinion of the International Searching Authority dated Aug. 9, 2021, issued in corresponding PCT Application No. Application No. PCT/US2021/029698 (15 pages).

International Search Report and Written Opinion of the International Searching Authority dated Jul. 19, 2021, issued in corresponding PCT Application No. PCT/US2021/029687 (11 pages).

Alachiotis, Nikolaos, et al. "dReDBox: A Disaggregated Architectural Perspective for Data Centers", Hardware Accelerators in Data Centers; Springer International Publishing AG, pp. 35-56. (Year: 2019).

Anonymous: "Dell Chassis Management Controller Version 6.20 for PowerEdge M1000e" Dec. 3, 2018 (Dec. 3, 2018) 274 pages, Retrieved from the Internet: URL://dl/del/com/topicspdf/dell-chassis-management-controller-v620-poweredge-m 1000e_users-guide_en-us.pdf.

International Searching Authority, International Search Report and Written Opinion dated Oct. 21, 2021 for corresponding PCT Application No. PCTUS2021029708 filed Apr. 28, 2021.

(56) References Cited

OTHER PUBLICATIONS

International Searching Authority, International Search Report and Written Opinion for corresponding PCT Application No. PCTUS2021029702 filed Apr. 28, 2021, Aug. 19, 2021, 13 pages.
International Searching Authority, International Search Report Written Opinion dated Jul. 19, 2021, issued in corresponding PCT Application No. PCT/US2021/029687, 11 pages.
International Searching Authority, International Search Report Written Opinion of corresponding PCT Application No. PCT/US2021/029698, dated Aug. 9, 2021, 15 pages.

* cited by examiner

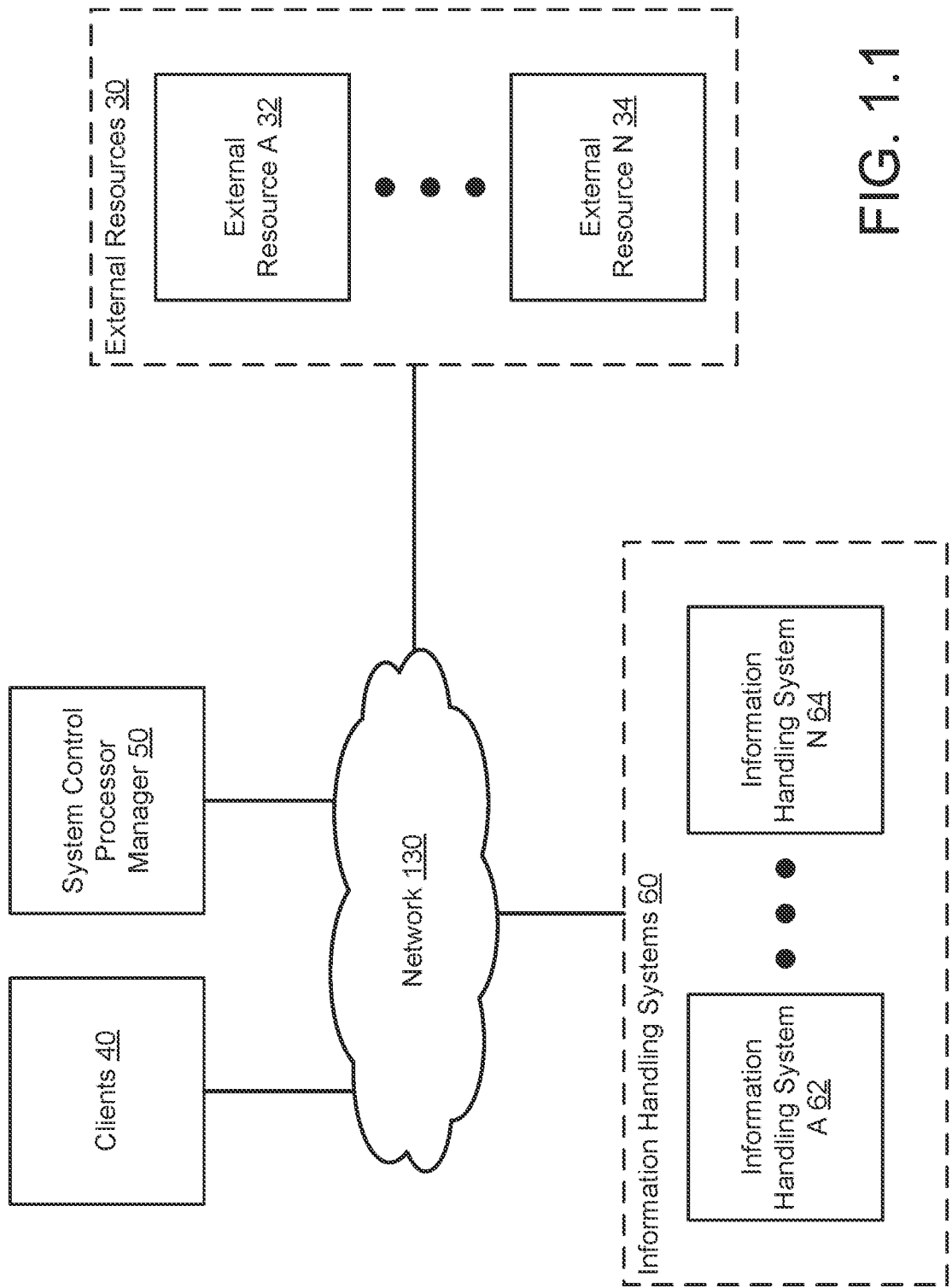
FIG. 1.1

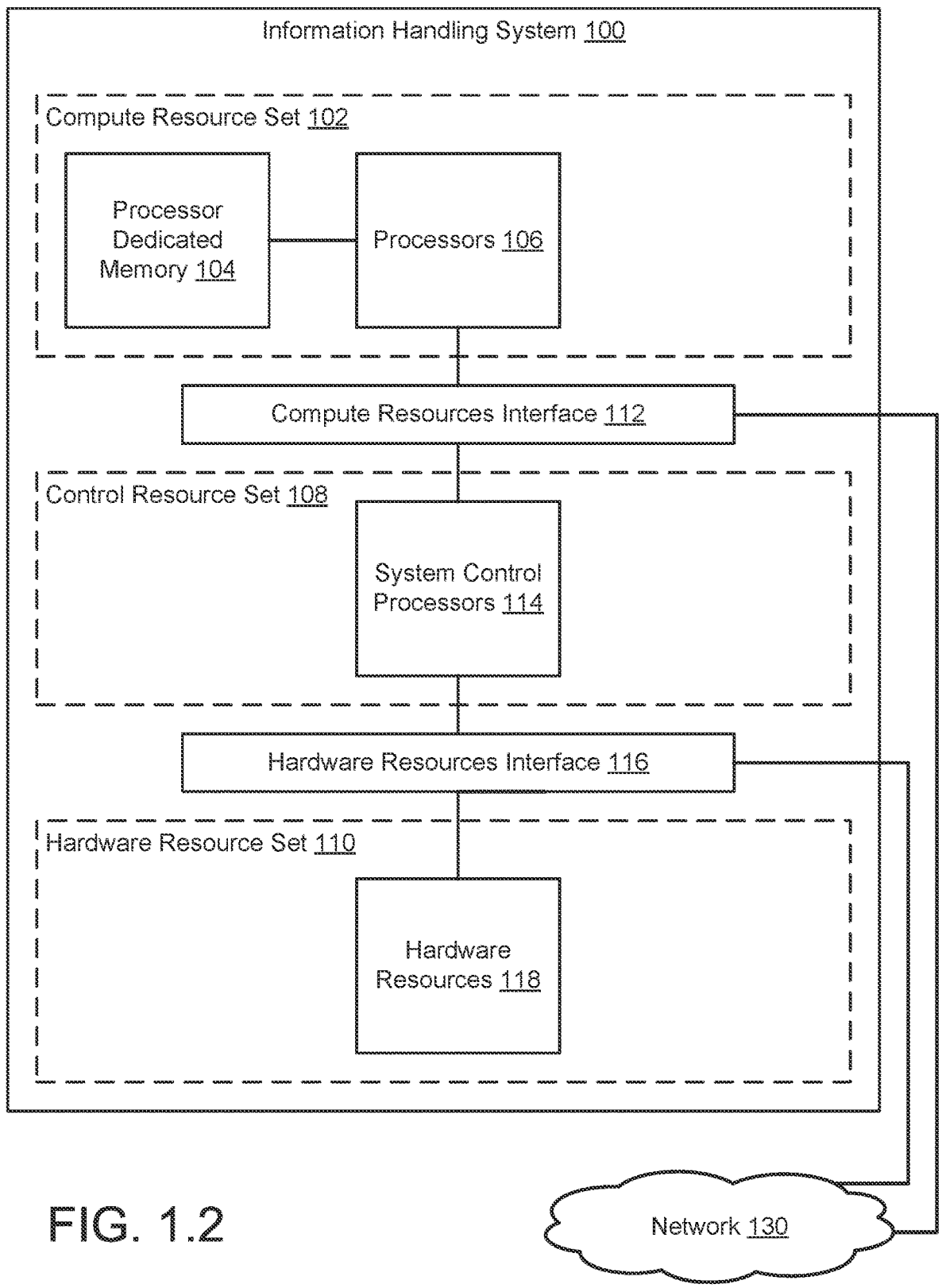
FIG. 1.2

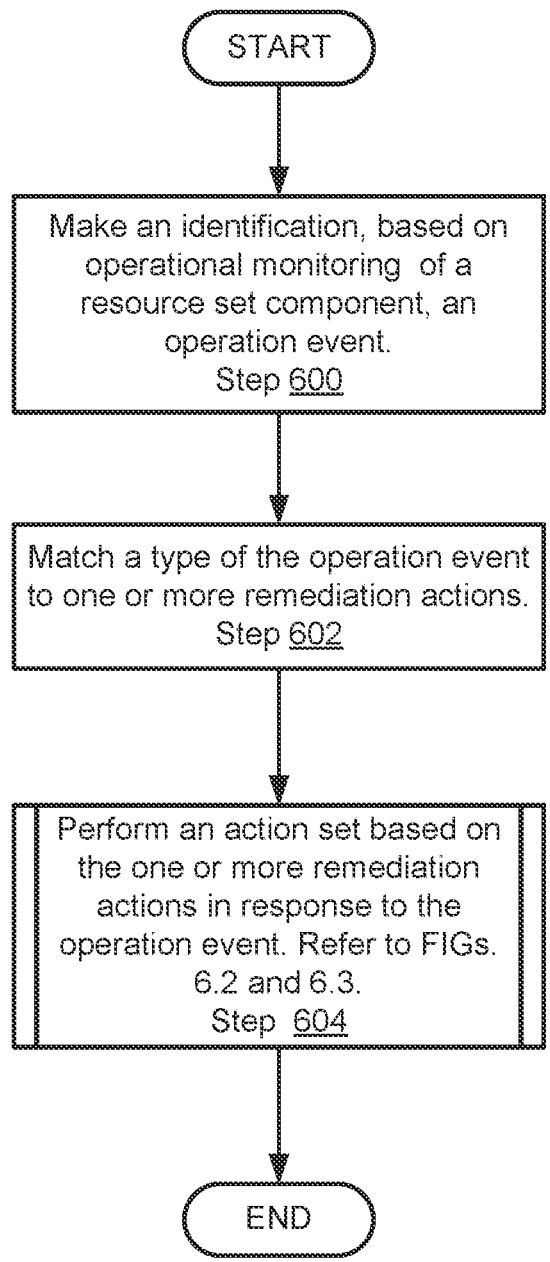
FIG. 6.1

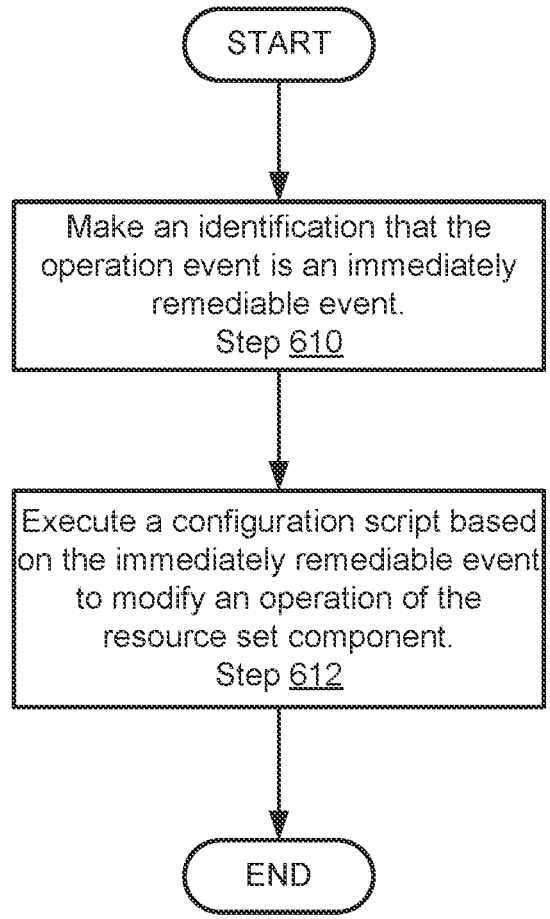
FIG. 6.2

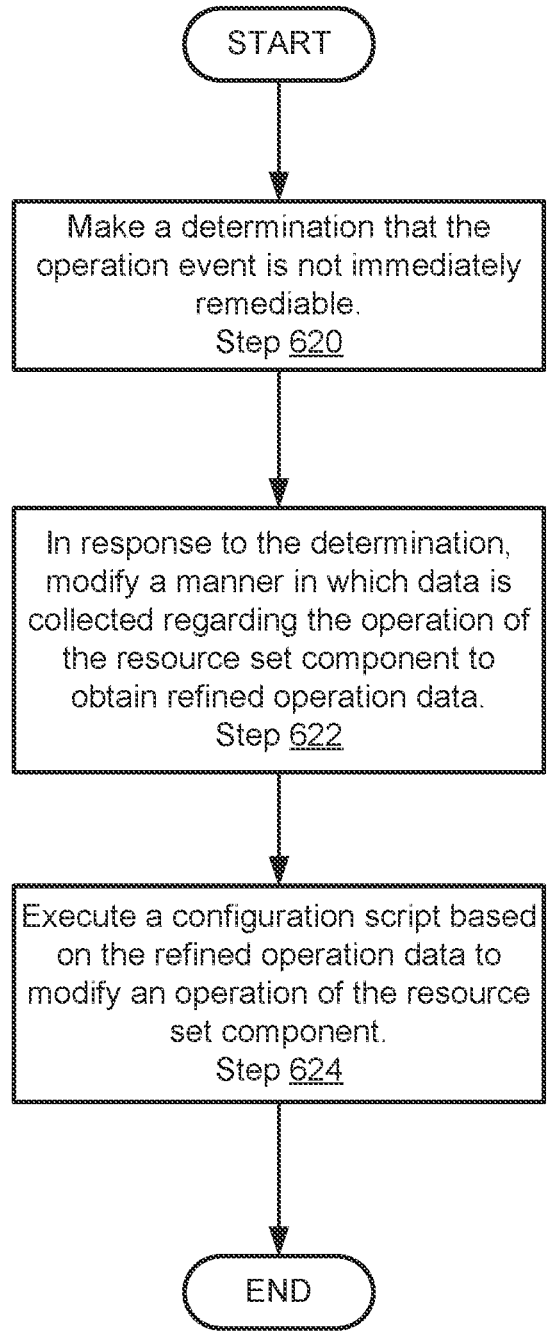
FIG. 6.3

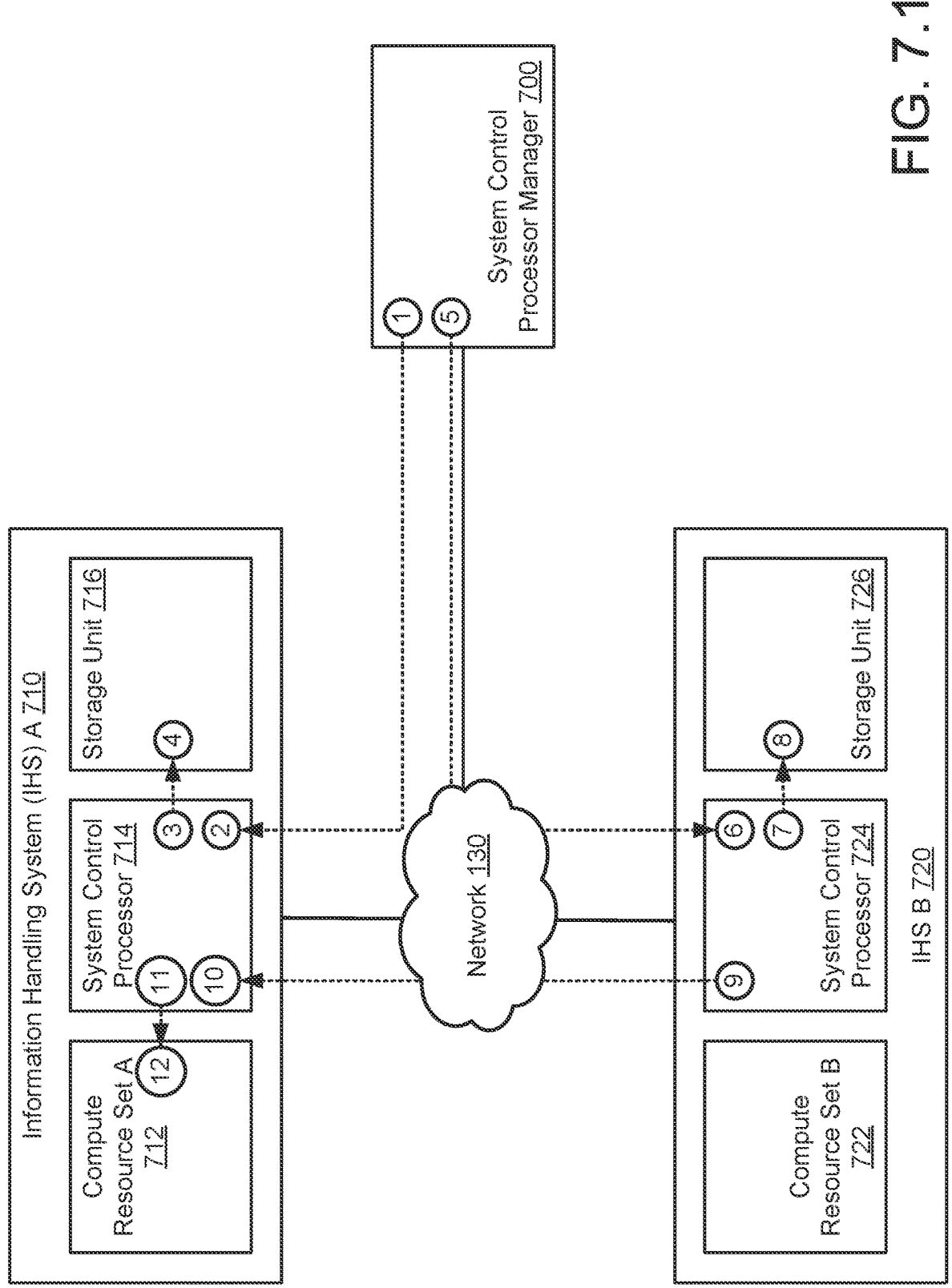
FIG. 7.1

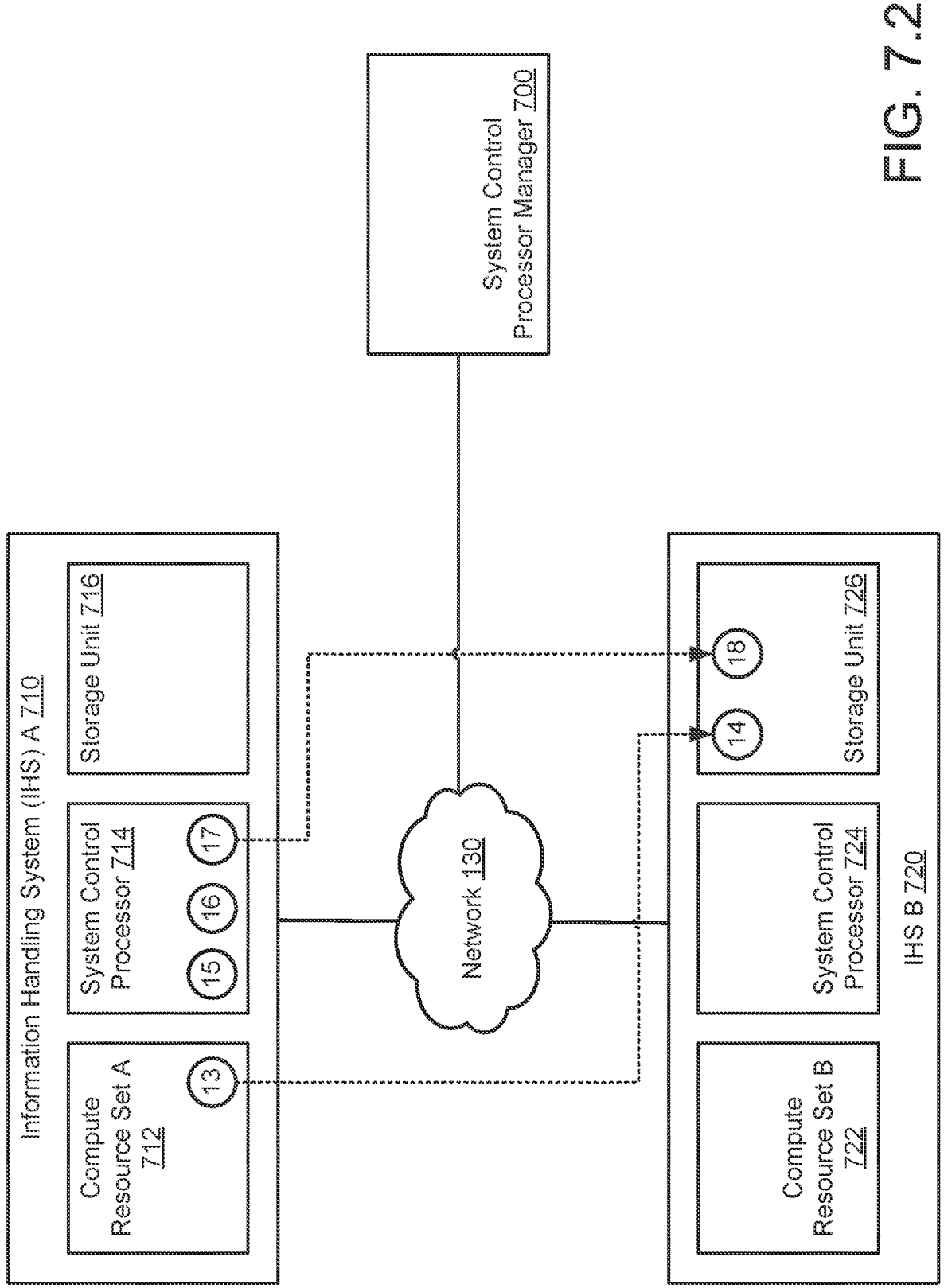
FIG. 7.2

SYSTEM AND METHOD FOR PERFORMING REMEDIATION ACTION DURING OPERATION ANALYSIS

BACKGROUND

Computing devices may provide services. To provide the services, the computing devices may include hardware components and software components. The services provided by the computing devices may be limited by these components.

SUMMARY

In one aspect, an information handling system for obtaining composed information handling systems in accordance with one or more embodiments of the invention includes resource set components and a system control processor. The system control processor makes an identification, based on monitoring of a resource set component of the resource set components, of an operation event; in response to the identification: makes a determination that the operation event is not immediately remediable based on the monitoring of the resource set component; in response to the determination: modifies the monitoring of the resource set component to obtain refined operation data for the resource set component; and performs an action set, based on the refined operation data, to modify operation of the resource set component.

In one aspect, a method for providing computer implemented services using composed information handling systems in accordance with one or more embodiments of the invention includes making an identification, based on monitoring of a resource set component of resource set components of an information handling system used to form at least one of the composed information handling systems, of an operation event; in response to the identification: making a determination that the operation event is not immediately remediable based on the monitoring of the resource set component; in response to the determination: modifying the monitoring of the resource set component to obtain refined operation data for the resource set component; and performing an action set based on the refined operation data to modify operation of the resource set component.

In one aspect, a non-transitory computer readable medium in accordance with one or more embodiments of the invention includes computer readable program code, which when executed by a computer processor enables the computer processor to perform a method for providing computer implemented services using composed information handling systems. The method includes making an identification, based on monitoring of a resource set component of resource set components of an information handling system used to form at least one of the composed information handling systems, of an operation event; in response to the identification: making a determination that the operation event is not immediately remediable based on the monitoring of the resource set component; in response to the determination: modifying the monitoring of the resource set component to obtain refined operation data for the resource set component; and performing an action set based on the refined operation data to modify operation of the resource set component.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 6.1 shows a flowchart of a method of responding to an operation event in accordance with one or more embodiments of the invention.

FIG. 6.2 shows a flowchart of a first method of remediating the operation of a composed information handling system in accordance with one or more embodiments of the invention.

FIG. 6.3 shows a flowchart of a second method of remediating the operation of a composed information handling system in accordance with one or more embodiments of the invention.

FIGS. 7.1-7.2 show diagrams illustrating the operation of an example system over time in accordance with one or more embodiments of the invention.

DETAILED DESCRIPTION

Figure 2:
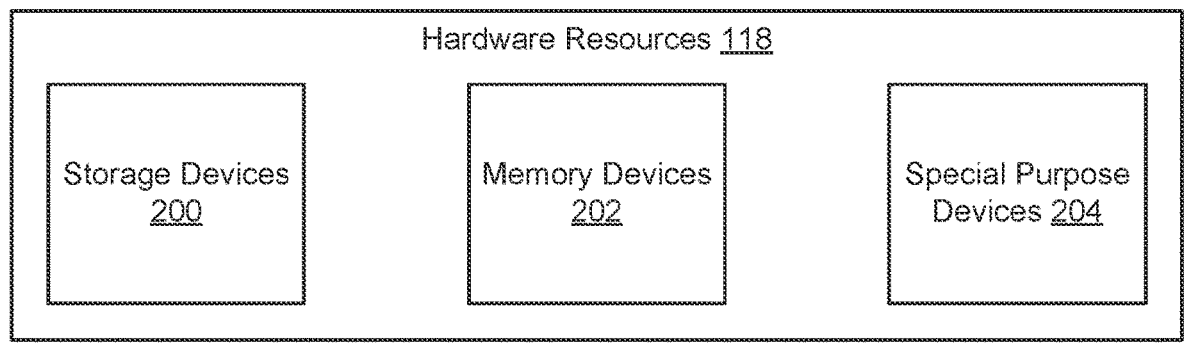
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services. The computing resources may include, for example, processing resources, memory, resources, storage resources, etc. These computing resources may be provided by any number of hardware devices referred to as resource set components when allocated to a system.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

When a composed system is operating, its operation may depend on the operational state of any number of resource set devices allocated to it. Consequently, if any of these resource set components enter into undesirable operating states, the operation of the composed information handling system may be negatively impacted.

To manage the operating states of resource set components, a composed information handling system may monitor the operating states of its resource set components. It may do so by collecting data (e.g., telemetry data) regarding the operation of its resource set components. The data may be collected by monitoring the flow of data between components, querying the resource set components regarding their operating states or health, etc.

In some scenarios, the data collected by the composed information handling system may be insufficient to ascertain whether a resource set component is operating in an undesired state. In such scenarios, the composed information handling system may automatically modify the manner in which it collects and analyzes data to more accurately ascertain whether the resource set component is operating in an undesired state. For example, the composed information handling system may increase a sampling rate of the data, may collect additional types of data, may collect data from other resource set components, and/or may perform other types of data collection and analysis steps.

If a resource set component is determined to be operating in an undesired state, the composed information handling system may automatically take action to remediate the operation of the resource set component. For example, the composed information handling system may reconfigure, restart, or otherwise modify the operation of the resource set component. By doing so, the composed information handling system may automatically place the resource set component into another operating state (e.g., a predetermined operating state, a desired operating state, a different operating state, etc.). The composed information handling system may also otherwise modify the operation of other resource set components (e.g., if doing so may beneficially impact the operation of the resource set component).

By monitoring and modifying the operation of resource set components, a composed information handling system may be more likely to operate in a desirable manner. For example, the composed information handling system may be less likely to fail, may be more likely to complete desired computations, and/or may provide a better user experience by avoiding phantom slowdowns or other undesirable modes of operation.

For example, consider a scenario in which an information handling system is used to form a composed information handling systems. The resulting composed information handling system may include resource set components and a system control processor. The system control processor may automatically monitor the operation of the resource set components and make identifications of events in the operation of the resource set components. The events may indicate whether resource set components are operating in desired states, undesired states, or unknown states that may require additional information to ascertain.

If the composed information handling system is able to immediately ascertain that the resource set components are operating in undesired states, then the composed system may determine that the resource set components may be immediately remediable by performing predetermined actions. If the composed information handling system is not able to immediately ascertain whether the resource set components are operating in desired states, then the composed system may determine that the resource set components are not immediately remediable.

If the resource set components are not immediately remediable, then the composed information handling system may automatically take action to gather additional information regarding the operation of these resource set components. The composed system may utilize the additional data to identify an action set that may be used to remediate the operation of the resource set components.

The composed information handling system may gather additional data by, for example, identifying a feature in a data flow indicative of a performance defect in the operation of the resource set components, increasing a sampling rate of a data flow associated with the resource set component, identifying a second feature in the data flow that was not detectable prior to increasing the sampling rate, initiating monitoring and analysis of the operation of other resource set components, and matching any subsequently identified features to corresponding actions usable to remediate the operation of the resource set components.

The aforementioned monitoring and analysis of telemetry data may be transparent to all entities other than the system control processor that is performing the monitoring. For example, the system control processor may interconnect the resource set components to one another thereby enabling it to intercept or otherwise monitor communications. The resource set components may be unaware of the presence of the system control processor and may view the other components as bare metal resources (e.g., rather than managed resources).

Turning to FIG. 1.1, FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling systems of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided. For example, some types of computer implemented services may be more compute intensive (e.g., modeling) while other computer implemented services may be more storage intensive (e.g., database) thereby having different computing resource requirements for these different services.

Clients (40) may request that the computer implemented services be provided. For example, the clients (40) may send requests to management entities to have the computer implemented services be provided.

In general, embodiments of the invention relate to systems, methods, and devices for managing the hardware resources of the information handling systems (60) and/or other resources (e.g., external resources (30)) to provide computer implemented services. The hardware resources of the information handling systems (60) may be managed by instantiating one or more composed information handling systems using the computing resources of the information handling systems (60), external resources (30), and/or other types of hardware devices operably connected to the information handling systems (60). Consequently, the computing resources allocated to a composed information handling system may be tailored to the specific needs of the services that will be provided by the composed information handling system.

When operating, the various hardware devices of the composed information handling systems may have different operating states. Some of these operating states may be desirable while others may not be desirable. For example, some operating states of the hardware devices may reduce the efficiency of performing computations, may render the computations performed by the information handling systems (60) to be incorrect, and/or may be undesirable for other reasons.

To manage the operating states of the hardware devices, the system of FIG. 1.1 may obtain information regarding the operation of the hardware components of the system. Based on the obtained information, the system may automatically perform action sets to remediate the operating states of these hardware devices to cause them to operate in desirable manners. These action sets may include, for example, performing predetermined actions to modify the operation of hardware components, modifying the manner in which data (e.g., telemetry data) regarding the operating states of the hardware components is collected, performing analysis on collected information regarding the operating states of the hardware components to identify their respective operating states, etc. By doing so, the hardware devices of the system of FIG. 1.1 may operate in a desirable rather than undesirable manner. Consequently, the information handling systems (60) may be more likely to operate in a desired manner, may be more likely to accurately perform computations, may perform computations in a more computationally efficient manner, and/or may improve a quality of user experience by providing a more responsive information handling system.

To manage the operation of information handling systems, the system may include a system control processor manager (50). The system control processor manager (50) may provide composed information handling system management services. Composed information handling system management services may include (i) obtaining composition requests for composed information handling systems from, for example, the clients (40), (ii) allocating computing resources from the information handling systems (60) and/or external resources (30) using system control processors to service the composition requests by instantiating composed information handling systems in accordance with the requests, and (iii) setting up management services for the allocated computing resources to monitor the operation of the hardware components that provide the allocated computing resources. By doing so, instantiated composed information handling systems may manage their operating states to maintain desired modes of operation.

The system control processor manager (50) may instantiate the composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities and types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For example, entities tasked with monitoring the health of computing resources of the composed information handling systems may be deployed in control resource sets. Accordingly, the health of these computing resources for providing computer implemented services requested by the clients (40) may be uniformly monitored across the information handling systems (60).

Further, the control resource set of each composed information handling system may be configured to automatically manage the operation of hardware components (e.g., resource set components) of the other resources sets allocated to a composed information handling system. The control resource set may actively monitor the operation of the resource set components and initiate remediation of the resource set components if the monitoring indicates that the resource set components are operating in undesirable manners. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. Consequently, a control resource set may actively monitor the operation of any number of resource set components from any number of information handling systems that are allocated to a composed information handling system.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may manage telemetry data regarding the computing resources of an information handling system, may perform actions on behalf of the system control processor manager (50) to aggregate computing resources together, may monitor the utilization and/or activity of computing resources for providing computer implemented services requested by the clients (40), and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction such as emulation, virtualization, indirection, security model, data integrity model, etc. For example, the system control processors of the control resource sets may provide the abstraction, emulation, virtualization, indirection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems.

By virtue of providing these layers of abstraction, the control resource set may monitor the operation of any number of resource set components. For example, when a processor needs to communicate with a hard disk drive of a hardware resource set, the communications may be routed through the control resource set. Consequently, the control resource set may transparently intercept these communications and perform analysis of these communications to identify the operating state of the processor and/or hard disk drive.

The external resources (30) may provide computing resources that may be allocated for use by composed information handling systems. For example, the external resources (30) may include hardware devices that provide any number and type of computing resources. The composed information handling system may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) for providing services requested by the clients (40) may also be efficiently and transparently monitored.

Different external resources (e.g., 32, 34) may provide similar or different computing resources. For example, some external resources may include large numbers of hard disk drives to provide storage resources while others may include graphics processing unit rendering farms. The external resources (30) may include any number and type of computing resources for allocation to composed information handling systems via system control processors of control resource sets. The control resource sets may similarly mediate communications between different resource sets of the information handling systems and the external resources (30) thereby enables the control resource sets to monitor these communications transparently to the resource sets.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5-6.3. The clients (40), system control processor manager (50), information handling systems (60), and/or external resources (30) may be implemented using other types of computing devices without departing from the invention. For additional details regarding computing devices, refer to FIG. 8.

While the system of FIG. 1.1 has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and management of the operation of the information handling system (100). To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources (e.g., the compute resource set may send bare metal communications to the control resource set, the control resource set may translate those bare metal communications into prepared resource compatible communications, and the control resource set may send the prepared resource compatible communications to the hardware resource set).

The control resource set (108) may also enable the utilization of any of the hardware components of the information handling system (100) by respective clients. When a composed information handling system is instantiated, it (and its hardware devices) may be utilized by a client by enabling the client to load application onto the composed information handling system. For example, the client may cause the composed information handling system to execute applications on the compute resource set (102) which, in turn, may utilize any number of hardware resource sets (e.g., 110) as part of their execution.

Because the control resource set (108) may mediate utilization of hardware resource sets (110) by compute resource sets (102), the control resource set (108) may transparently ascertain the utilization of the hardware devices (collectively referred to as resource set components of a composed information handling system) of these resource sets. To do so, the control resource set (108) may (i) intercept (as part of presenting computing resources of hardware resource sets to compute resource sets) communications between resource sets which may be used to infer the utilization of these hardware devices.

Additionally, the intercepted communications may be utilized as telemetry data to ascertain the operating states of the resource set components. By virtue of the limited computing capacity of the control resource set (108), the control resource set (108) may sample the communications at a lower rate generally until an event is identified. The event may be identified using any method (e.g., pattern recognition, trained machine learning model, heuristic analysis, etc.) without departing from the invention. The event may indicate that either (i) the monitored component has entered into a predetermined state or (ii) that additional data should be collected to identify the operating state of the monitored component.

If it is ascertained that the monitored component has entered a predetermined state that is undesirable, the control resource set (108) may automatically perform one or more actions (e.g., such as executing a script or other set of instructions) to modify the operation of the monitored component to place it into a predetermined (e.g., desired) operating state.

If it is ascertained that additional data should be collected regarding the monitored component, then the control resource set (108) may monitor its collection activity to collect additional information regarding the monitored component and/or other components. The subsequently collected data may then be used to ascertain a state into which the monitored component has entered.

The compute resource set (102) may include one or more processors (106). The processors (106) of the compute resource set (102) may be operably connected to one or more system control processors (114) of the control resource set (108). For example, the processors (106) may be connected to a compute resource interface (112), which is also connected to the system control processors (114). The compute resource interface (112) may enable the processors (106) to communicate with other entities via bare metal communications. Also, the compute resource interface (112) may enable system control processors (114) of the control resource set (108) to monitor the activity and/or utilization of the processors (106) and/or processor dedicated memory (104). For example, the compute resources interface (112) may support sideband communications to the hardware devices of the compute resource set (102) thereby enabling health information for these hardware devices to be obtained by the system control processors (114) (e.g., to obtain health data to supplement the information obtained by monitoring communications between the processors (106) and/or other resource set components).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., computing resources of the hardware resource set (110), external resources, other hardware resource sets of other information handling systems, etc.) to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model. The architecture or model may define, for example, when and how components communicate with one another, when and how resources are allocated, etc.

In one or more embodiments of the invention, control plane entities utilize computing resources presented through one or more layers of indirection, abstraction, virtualization, etc. In other words, an indirect use of hardware devices and computing resources provided thereby. In the information handling system of FIG. 1.2, the system control processors (114) may present abstracted resources, indirection layers, virtualization layers, etc. as bare metal resources.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110)), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources. Accordingly, the control plane of a composed information handling system may believe that any number of resources may be directly accessible as bare metal resources even when the resources are, for example, hosted by other information handling systems.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106). Consequently, these entities may not be able to interfere with monitoring of the use of these resources. In contrast, if an agent or other entity for monitoring computing resource health is executing using the processors (106), other entities executing using the processors (106) may be able to interfere with the operation of the monitoring entity. Accordingly, embodiments of the invention may provide a method of monitoring the operation of control resource set components that is less susceptible to interference by other entities.

Figure 3:
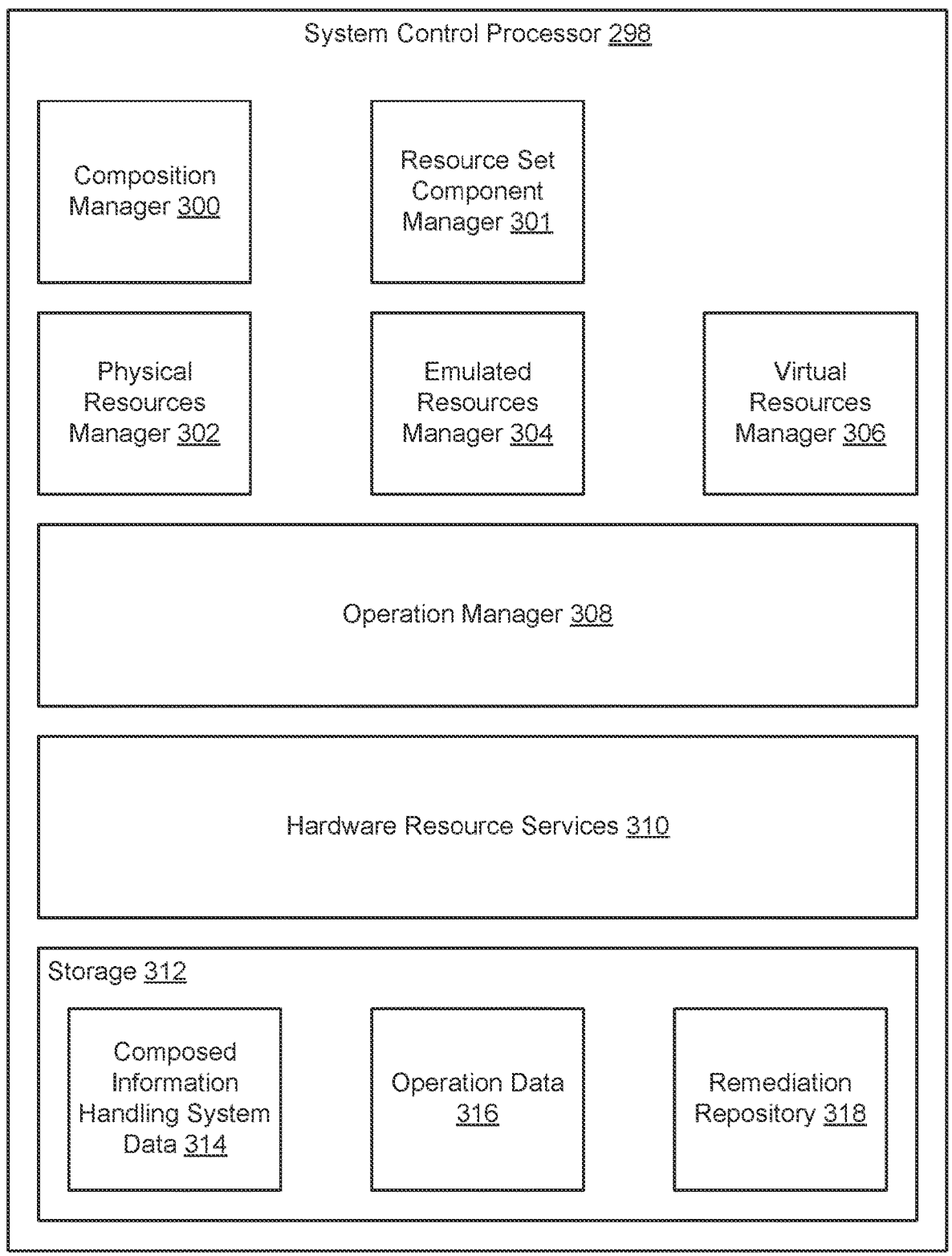
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (TO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor (e.g., via collection of telemetry data) the operations of these other devices to identify the operation, health, and/or other characteristics of these hardware devices.

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems and identify active hardware devices of the information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5-6.3. The information handling system (100) may be implemented using other types of computing devices without departing from the invention. For additional details regarding computing devices, refer to FIG. 8.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling systems may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204) (the aforementioned being referred to as resource set components when incorporated into a composed information handling system).

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models, security models, workload performance availability models, reporting models, etc. For example, the system control processors may cause multiple copies of data to be redundantly stored, to be stored with error correction code, and/or other information usable for data integrity purposes.

The manner of operation of these devices may be transparent to the computing resource sets utilizing these hardware devices for providing computer implemented services. Consequently, even though the resulting composed information handling system control plane may be unaware of the implementation of these models, the composed information handling systems may still operate in accordance with these models thereby providing a unified method of managing the operation of composed information handling systems.

Further, by mediating communications between the hardware resources (118) and compute resource sets, the control resource set may monitor communications between these device, may query the hardware resources (118) to obtain information regarding their operation, and/or may obtain automatically generated telemetry information by the hardware resources (118). Consequently, the control resource set may be able to use the aforementioned information to ascertain the operating states of any of the resource set components.

While the hardware resources (118) have been illustrated and described as including a limited number of specific components, hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation, reallocation of resources to/from composed systems, operation of composed information handling systems, and management of information handling systems by ascertaining the operating states of the resource set components of the composed systems. By doing so, a system that includes information handling systems may dynamically instantiate and recompose (e.g., add/remove/replace resources) composed information handling systems to provide computer implemented services while maintaining the operating states of the resource set components allocated to each composed system.

To instantiate and operate composed information handling systems, the system control processor (298) may include a composition manager (300), a resource set component manager (301), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition/recomposition requests for composed information handling systems, (iv) based on the composition requests, prepare and present resources as bare metal resources to compute resource sets, (v) setup management services for these allocated resource set components, (vi) instantiate applications in composed information handling systems to cause the composed information handling systems to provide computer implemented services, conform their operation to security models, etc., (vii) add/remove/recompose resources presented to the compute resource sets of composed information handling systems dynamically in accordance with utilization levels of the resources, and/or (viii) coordinate with other system control processors to provide distributed system functionalities and/or transfer performance of applications and/or computer implemented services between composed information handling systems. By providing the above functionalities, a system control processor in accordance with one or more embodiments of the invention may enable distributed resources from any number of information handling systems to be aggregated into a composed information handling system to provide computer implemented services while managing the operation of resource set components allocated to each of these composed information handling systems.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., TO from the processors) and respond in a manner consistent with responses of corresponding bare metal devices (e.g., memory, storages, network interface cards, etc.). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition request (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

Once resources are allocated to a composed information handling system, the composition manager (300) may then setup management services for them to manage the operation of each resource set component that has been allocated. To do so, the composition manager (300) may invoke the functionality of the resource set component manager (301) or otherwise notify the resource set component manager (301) of the presence of these resource set components. By doing so, the resource set component manager (301) may monitor the operation of these components, modify the monitoring to more accurately ascertain the operation of these components, and modify the operation of these components if warranted based on the monitoring.

When operating, the resource set component manager (301) may utilize data in storage (312) including, for example, operation data (316) reflecting the operation of any number of resource set components and a remediation repository (318) which may include information regarding actions to be performed to modify the operating states of various resource set components. These data structures are discussed in greater detail below.

By forming composed information handling systems as discussed above, embodiments of the invention may provide a system that is able to effectively utilize distributed resources across a range of devices to provide computer implemented services.

Figure 5:
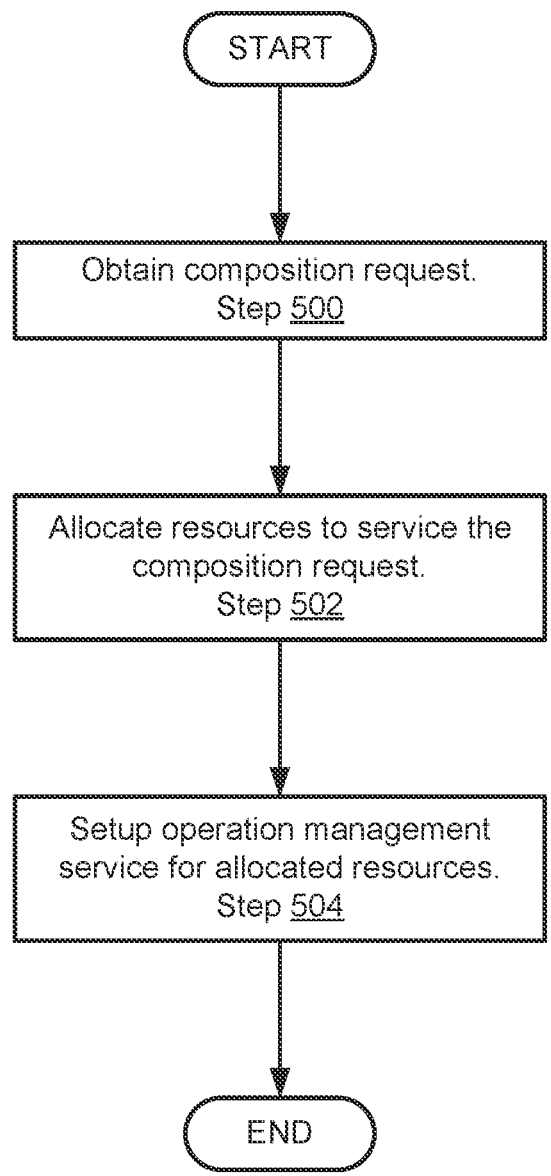
FIG. 5 shows a flowchart of a method of instantiating composed information handling systems in accordance with one or more embodiments of the invention.

When providing its functionality, the composition manager (300) and/or resource set component manager (301) may perform all, or a portion, of the methods illustrated in FIGS. 5-6.3.

While the resource set component manager (301) is illustrated in FIG. 3 as being part of the system control processor (298), the resource set component manager (301) may be implemented as a separate device from the system control processor (298) without departing from the invention. For example, the resource set component manager (301) may be implemented as a service hosted by any number of devices including, in part, the composed information handling system to which the system control processor (298) is allocated).

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system(s) allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications (e.g., to obtain address translation tables, emulation tables, etc.).

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), resource set component manager (301), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.2). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, of the methods illustrated in FIGS. 5-6.3.

The system control processor (298) may be implemented using computing devices.

The computing devices may be, for example, an embedded computing device such as a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5-6.3. The system control processor (298) may be implemented using other types of computing devices without departing from the invention. For additional details regarding computing devices, refer to FIG. 8.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, any of the composition manager (300), resource set component manager (301), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), resource set component manager (301), physical resources manager (302), emulated resources manager (304), virtual resources manager (306), operation manager (308), and/or hardware resource services (310). The composition manager (300), resource set component manager (301), physical resources manager (302), emulated resources manager (304), virtual resources manager (306), operation manager (308), and/or hardware resource services (310) may be implemented using other types of hardware devices without departing from the invention.

In one or more embodiments of the invention, any of the composition manager (300), resource set component manager (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), resource set component manager (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), operation data (316), and a remediation repository (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The operation data (316) may be implemented using one or more data structures that include information regarding the operation of any number of resource set components. The operation data (316) may include telemetry data associated with any number of these resource set components. The telemetry data may include, for example, information derived from communications from these components that traversed through the system control processor (298), information from the resource set components themselves such as health monitoring data, and/or information collected from other sources (e.g., other system control processors monitoring other communications).

The data structures of the operation data (316) may be implemented using, for example, lists, tables, unstructured data, databases, etc. While illustrated in FIG. 3 as being stored locally, the operation data (316) may be stored remotely and may be distributed across any number of devices without departing from the invention.

The operation data (316) may be maintained by, for example, the resource set component manager (301). For example, the resource set component manager (301) may add, remove, and/or modify information included in the operation data (316) to cause the information included in the operation data (316) to reflect the state of the information handling system and/or other information handling systems.

The remediation repository (318) may be implemented using one or more data structures that includes information regarding activities to be performed by the system control processor (298) based on the operation data (316). These actions may be used to remediate the states of one or more resource set components.

For example, the remediation repository (318) may specify one or more actions to be performed when the operation data (316) meets predetermined characteristics. When the operation data (316) meets these characteristics, the system control processor (298) may conclude that the monitored resource set component has entered an undesirable operating state. The remediation repository (318) may specify actions that when performed may modify the operating state of the resource set component to match a desired state.

In another example, the remediation repository (318) may specify changes in how the operation data (316) is to be collected in response to the operation data (316) meeting predetermined characteristics. The changes may include, for example, (i) increasing/decreasing a sampling rate of the resource set components, initiating monitoring of other resource set components, and scheduling a time in the future when monitoring of a resource set component should be initiated. The result of this change in collection of the operation data (316) may better enable the system control processor (298) to identify events that indicate that a resource set component has entered an undesirable operating state and requires remediation to be placed into a desirable operating state.

The remediation repository (318) may be organized as a table. Each row may include one or more operating conditions to which operating data may be matched. Each row may also include one or more corresponding actions to be performed when operation data is matched to the operating conditions specified by the respective row. The operating conditions and corresponding one or more actions may be specified at any level of granularity without departing from the invention.

The remediation repository (318) may be maintained by, for example, the resource set component manager (301). For example, the resource set component manager (301) may add, remove, and/or modify information included in the remediation repository (318) in response to instructions from users such as system administrators.

The data structures of the remediation repository (318) may be implemented using, for example, lists, tables, unstructured data, databases, etc. While illustrated in FIG. 3 as being stored locally, the remediation repository (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
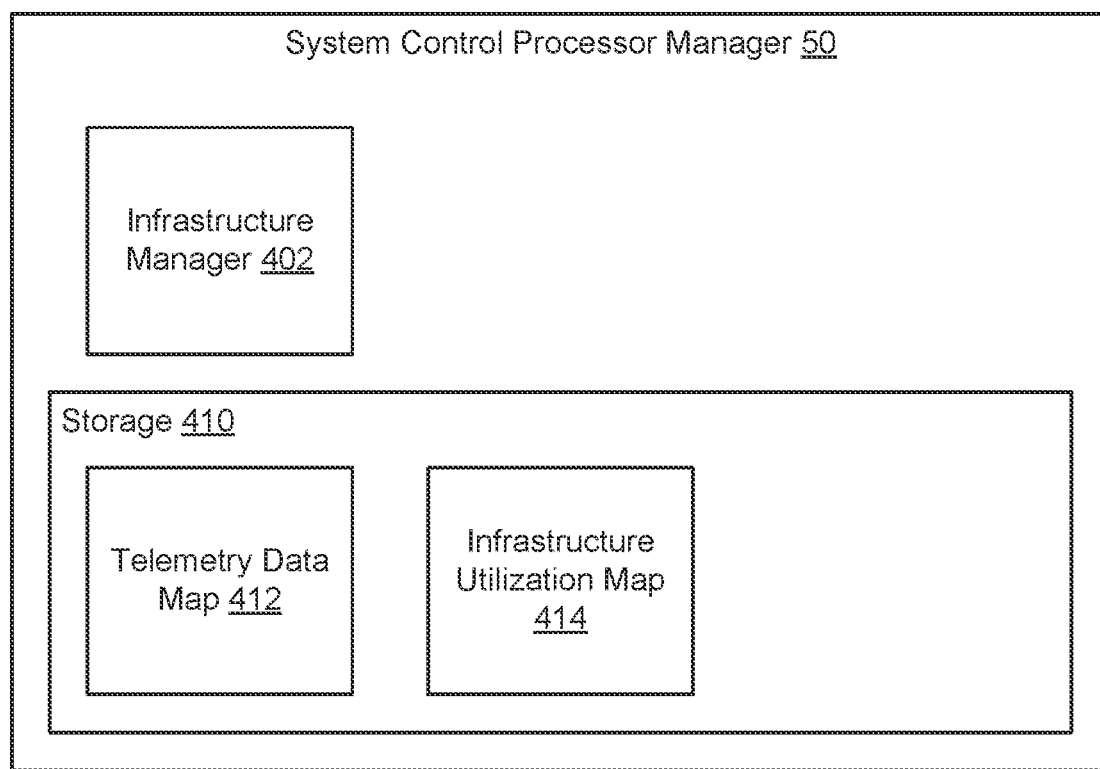
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems and recomposing composed information handling systems over time. To do so, the system control processor manager (50) may include an infrastructure manager (402) and storage (410). Each of these components is discussed below.

The infrastructure manager (402) may provide composition services. Composition services may include obtaining composition/recomposition requests for composed information handling systems, determining the resources to allocate to instantiate composed information handling systems, add/remove resources to recompose composed information handling systems, manage transfers of workloads between composed information handling systems for recomposition purposes, and cooperating with system control processors to allocate the identified resources. By doing so, the infrastructure manager (402) may cause any number of computer implemented services to be provided using the composed information handling systems.

To cooperate with the system control processors for composed information handling system composition and recomposition purposes, the infrastructure manager (402) may obtain telemetry data regarding the computing resources of any number of information handling systems and/or external resources that are available for allocation. The infrastructure manager (402) may aggregate this data in a telemetry data map (412), which may be subsequently used to identify resources of any number of information handling systems and/or external resources to satisfy composition and/or recomposition requests (e.g., instantiate one or more composed information handling systems to meet the requirements of the composition requests, modify resource allocations to existing composed information handling systems, etc.).

When the infrastructure manager (402) identifies the computing resources to be allocated, the infrastructure manager (402) may communicate with any number of system control processors (e.g., of control resource sets of information handling systems) to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated and/or recomposed, the infrastructure manager (402) may add information reflecting the resources allocated to composed information handling systems, the workloads being performed by the composed information handling systems, and/or other types of information to an infrastructure utilization map (414). The infrastructure manager (402) may utilize this information to, for example, decide whether computing resources should be added to or removed from composed information handling system (e.g., whether the computing resources are free for allocation or currently utilized by other entities). Consequently, computing resources may be dynamically re-provisioned.

In addition to adding information to the infrastructure utilization map (414), the infrastructure manager (402) may specify the types of data that system control processors collect and analyze to determine the operating state of resource set components. Additionally, the infrastructure manager (402) may specify the content of the remediation repository hosted by the system control processors thereby specifying the actions to be taken by system control processors based on the collected and analyzed data.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5-6.3.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in-line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412) and the infrastructure utilization map (414). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using any combination and quantity of, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIG. 5 shows methods that may be performed by components of the system of FIG. 1.1 to manage composed information handling systems.

FIG. 5 shows a flowchart of a method in accordance with one or more embodiments of the invention. The method depicted in FIG. 5 may be performed to instantiate composed information handling systems in accordance with one or more embodiments of the invention. The method shown in FIG. 5 may be performed by, for example, a system control processor manager (e.g., 50, FIG. 1.1). Other components of the system in FIG. 1.1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a composition request is obtained. The composition request may be obtained from a client or another entity. The composition request may request that a new composed information handling system be instantiated or that the quantity of resources allocated to an existing composed information handling system be modified. The requests may be explicit, or intent based.

In step 502, resources to service the composition request are allocated. To allocate the resources, the resources may be identified using a telemetry data map (412, FIG. 4) to identify various resource sets having resources necessary to satisfy the composition request or existing resources already allocated to the composed information handling system that can be deallocated (e.g., depending on the type of request).

For new composition requests, at least one compute resource set, one control resource set, and one hardware resource set may be identified. The compute and control resource set may include any number of resource set components.

Once identified, instructions for presenting the hardware resource set to the compute resource set may be sent to the system control processor. In accordance with the instructions, the system control processor may begin management of the hardware resources. The management may include, for example, setting up virtualization, emulation, data protection, encryption, and/or other types of management services for the hardware devices of the hardware resource set. The control resource set may present, as bare metal resources, the managed hardware resource set. After presentation, the compute resource set may discover the bare metal resource and begin to utilize them to provide desired computer implemented services.

For recomposition requests (e.g., additions/removals to/from existing composed information handling systems), at least one of any type of resource set may be identified to satisfy the request. The identified resource set may be added or removed from the composed information handling system to satisfy the request.

The control resource set may also appropriately update its managed data structures reflecting the newly composed information handling system.

In step 504, operation management services for the allocated resources are setup. Specifically, the operation management services may specify the data to be collected regarding the operation of the resource set components allocated to the composed information handling system. For example, the (i) type of data to be collected, (ii) rate at which the data is collected, (iii) the manner in which the data is collected, and/or (iv) other characteristics regarding the data collection process may be established. The aforementioned process may then be implemented by the system control processor.

For example, as part of establishing operation management services for the composed information handling system, a system control processor allocated to the composed information handling system may be instructed to collect (a) operation data indirectly by intercepting communications from a resource set component traversing through the system control processor, (ii) operation data directly by instructing the system control processor to query the resource set component with respect to its health, operating state, etc., and/or (iii) obtain operation data in different manners. The operation data may include any type and quantity of data that may be utilized to ascertain the operating state of the resource set component or other characteristic of the resource set component.

In one or more embodiments of the invention, establishing the operation management services includes coordinating the collection of operation data by multiple system control processors. For example, in some embodiments of the invention, a composed information handling system may include multiple system control processors that collectively operate to present any number of hardware resource sets to compute resource sets. In such a scenario, the system control processors may be configured to appropriately collect, aggregate, and distribute operation data to enable any of the system control processors to manage the operation of the resource set components allocated to the composed information handling system.

The method may end following step 504.

Using the method illustrated in FIG. 5, composition requests may be serviced in a manner that enables the information handling systems to continue to monitor and manage the operation of their respective resource set components. To do so, the system may, at the time of composition and/or recomposition, setup management services across the system control processors.

Turning to FIGS. 6.1-6.3, these figures illustrate methods that may be performed by a system control processor to manage the operation of an information handling system. For example, any of these methods may be performed after a composed information handling system is instantiated.

FIG. 6.1 shows a flowchart of a method in accordance with one or more embodiments of the invention. The method depicted in FIG. 6.1 may be performed to remediate the operation of a resource set component in accordance with one or more embodiments of the invention. The method shown in FIG. 6.1 may be performed by, for example, a system control processor (e.g., 298, FIG. 3). Other components of the system in FIG. 1.1 may perform all, or a portion, of the method of FIG. 6.1 without departing from the invention.

While FIG. 6.1 is illustrated as a series of steps, any of the steps may be omitted, performed in a different order, additional steps may be included, and/or any or all of the steps may be performed in a parallel and/or partially overlapping manner without departing from the invention.

In step 600, an identification of an operation event is made based on operational monitoring of a resource set component. As noted with respect to FIG. 5, operational monitoring of any number of resource set components may be initiated when or after a composed information handling system is instantiated.

The operational monitoring may include obtaining data regarding the operation of the resource set component. The data may include information regarding communications by the resource set component intercepted by a system control processor and/or other types of data (e.g., data provided by the resource set component such as health monitoring, operational status, etc.).

The operation event may be identified by matching the operational data to information included in the remediation repository (e.g., 318, FIG. 3). As previously discussed, the remediation repository may be organized in a manner that enables the operation data to be matched to different rows or other sub-portions of the repository. The matched portions of the remediation repository may include actions to be performed.

For example, consider a scenario where the operation data specifies that a resource set component has repeatedly sent the same data access request to a hard disk drive via a system control processor. In such a scenario, that behavior may be matched to a row of the remediation repository that specifies that the resource set component should be reset upon identifying that it is repeatedly sending the same data access requests.

The identified operation event may relate to an operating state of the resource set component. For example, the operational monitoring may indicate that the operation of the resource set component matches one or more predetermined states. These predetermined states may not be desirable. For example, the resource set component may operate undesirably, may not operate correctly, or may otherwise operate in an undesired manner. Consequently, when an operation event is identified, the system control process may take action to attempt to remediate the identified operation event.

In step 602, a type of the operation event is matched to one or more remediation actions. As noted above with respect to step 600, the remediation repository may be organized. In some embodiments of the invention, the remediation repository may be organized into different portions with corresponding types of operation events. Consequently, when an operation event is identified in step 600, the type of the operation event may be matched to the corresponding portion of the remediation repository. The matched portion of the remediation repository may specify the one or more remediation actions.

In step 604, an action set is performed based on the one or more remediation actions in response to the operation event. The action set may be performed via the methods illustrated in FIGS. 6.2 and 6.3. Depending on the type of remediation actions matched in step 602, one or more of the methods illustrated in FIG. 6.2 and/or 6.3 may be performed.

The resulting action set may remediate the resource set component. Remediating the resource set component may place it into a predetermined operation state. Performing the action set may also include, for example, logging information regarding the performed operations, sending notification or other types of information to other entities (e.g., emails, text messages, database entries, etc.) thereby distributing information regarding the actions performed in response to the operation event identified in step 600.

The resulting action set may include, for example, performing additional monitoring of the resource set component, performing analysis of the resource set component, monitoring other resource set components (e.g., those that may be associated/related to the resource set component), and/or performing actions to modify the operation of the resource set component. By doing so, the operation of the resource set component may be conformed to a desired operating state.

The method may end following step 604.

Using the method illustrated in FIG. 6.1, an information handling system may maintain the operation of its resource set components in a manner that is expected.

Turning to FIG. 6.2, FIG. 6.2 shows a flowchart of a method in accordance with one or more embodiments of the invention. The method depicted in FIG. 6.2 may be performed to manage a resource set component when it is in an immediately remedial state in accordance with one or more embodiments of the invention. The method shown in FIG. 6.2 may be performed by, for example, a system control processor (e.g., 298, FIG. 3). Other components of the system in FIG. 1.1 may perform all, or a portion, of the method of FIG. 6.2 without departing from the invention.

While FIG. 6.2 is illustrated as a series of steps, any of the steps may be omitted, performed in a different order, additional steps may be included, and/or any or all of the steps may be performed in a parallel and/or partially overlapping manner without departing from the invention.

In step 610, the operation event is identified as an immediately remediable event. The operation event may be identified as an immediately remediable event based on the actions to which the even was matched in step 604 of FIG. 6.1.

When an event is immediately remediable, the matched actions may be performed without requiring additional data collection. In contrast, an event that is not immediately remediable may be matched to actions that include additional data collection and analysis actions. For example, the data collection may include increasing a sampling rate of the operation of the resource set component to obtain higher resolution data.

In step 612, a configuration script is executed (or other type of data structure that includes instructions that may be performed) based on the immediately remediable event to modify an operation of the resource set component. For example, the actions matched in step 604 of FIG. 6.1 may specify execution of a corresponding configuration script. The configuration script may modify the operation of the resource set component by, for example, resetting it, modifying the amount of power or other operation controls, etc.

The configuration script may be a data structure that when executed by the system control processor causes the system control processor to perform one or more actions. These actions may include sending information, commands, and/or instructions to a resource set that hosts the resource set component. In response, the resource set that hosts the resource set component may perform one or more actions to modify the operation of the resource set component.

The method may end following step 612.

Turning to FIG. 6.3, FIG. 6.3 shows a flowchart of a method in accordance with one or more embodiments of the invention. The method depicted in FIG. 6.3 may be performed to manage a resource set component when it is not in an immediately remedial state in accordance with one or more embodiments of the invention. The method shown in FIG. 6.3 may be performed by, for example, a system control processor (e.g., 298, FIG. 3). Other components of the system in FIG. 1.1 may perform all, or a portion, of the method of FIG. 6.3 without departing from the invention.

While FIG. 6.3 is illustrated as a series of steps, any of the steps may be omitted, performed in a different order, additional steps may be included, and/or any or all of the steps may be performed in a parallel and/or partially overlapping manner without departing from the invention.

In step 620, the operation event is identified as not being an immediately remediable event. The operation event may be identified as note being an immediately remediable event based on the actions to which the event was matched in step 604 of FIG. 6.1.

When an event is not immediately remediable, the matched actions may be related to additional data collection and analysis. For example, the matched actions may specify that additional data is to be collected at a higher sample rate, different types of data are to be collected, different resource set components are to be monitored, etc. These actions may cause the system control processor to gather additional data that may, in turn, identify an event as an immediately remediable event.

In step 622, the manner in which data is collected regarding the operation of the resource set component (and/or other resource set components) is modified to obtain refined operation data in response to the determination. The data collection may be modified based on the actions identified in step 604 of FIG. 6.1. For example, the matched actions may include data collection and analysis.

The modified data collection may include, for example, (i) modifying the sample rate of collected data, (ii) initiating collection of different types of data (e.g., querying the resource set component for data), (iii) performing additional analysis of the collected data which may, in turn, cause additional modifications of the data collection to be initiated, and (iv) initiating data collection with respect to other resource set components. The modified data collection may include other types of activity without departing from the invention. The resulting modified data collection may be performed for any duration of time (e.g., finite, ongoing, etc.).

In step 624, a configuration script is executed (or other type of data structure that includes instructions that may be performed) based on the refined operation data to modify an operation of the resource set component. For example, the refined data collection may be matched to actions in the remediation repository that cause a corresponding configuration script to be executed. The configuration script may modify the operation of the resource set component by, for example, resetting it, modifying the amount of power or other operation controls, modifying its configuration, etc.

The configuration script may cause any number and type of actions to be performed. The actions of the configuration script may modify the operation of the resource set component and/or other components (e.g., components associated with the resource set component, unrelated components, etc.). The configuration script may cause the resource set component to enter a predetermined operating state which may be different from its operating state prior to execution of the configuration script. One of ordinary skill in the art will appreciate that while described with respect to a configuration script (e.g., executed instructions in a script based language), any type of data structure (e.g., executable binary, plain text file, etc.) may be used to encode the actions that will be performed based on the obtained refined operation data without departing from the invention.

The method may end following step 624.

Using the method illustrated in FIG. 6.3, an information handling system may automatically take proactive action to obtain additional information regarding the operation of resource set components. By doing so, the information handling system may be better able to identify the action operating states of resource set components and, consequently, may be better able to remediate there operation if so warranted based on the operating state identification.

To further clarify embodiments of the invention, a non-limiting example is provided in FIGS. 7.1-7.2. These figures illustrate a system similar to that illustrated in FIG. 1.1. Actions performed by components of the system are illustrated by numbered, circular boxes interconnected, in part, using dashed lines terminating in arrows. For the sake of brevity, only a limited number of components of the system of FIG. 1.1 is illustrated in FIGS. 7.1-7.2.

EXAMPLE

Consider a scenario as illustrated in FIG. 7.1 in which a system control processor manager (700) is instantiating a composed information handling system using two information handling systems (710, 720). To instantiate the composed information handling system, the system control processor manager (700), at step 1, decides that compute resource set A (712), storage unit (716), and storage unit (726) should be allocated to the composed information handling system.

At step 2, the system control processor manager (700) generates and sends a composition request to the system control processor (714) of the information handling system A (710).

In response, at step 3, the system control processor (714) sets up management services for the storage unit (716). At step 4, the system control processor (714) allocates the managed storage resources of the storage unit (716) to the composed information handling system and updates corresponding managed data structures to reflect this allocation.

At step 5, the system control processor manager (700) generates and sends a second composition request to the system control processor (724) of the information handling system B (720). In response, at step 6, the system control processor (724) identifies that it will work with the system control processor (714) to allocate the storage resources of the storage unit (726) to the composed information handling system (e.g., without allocating the compute resource set B (722)).

At step 7, the system control processor (724) sets up management services for the storage unit (726). At step 8, the system control processor (724) allocates the storage resources of the storage unit (726) to the composed information handling system and updates corresponding managed data structures to reflect this allocation.

At step 9, the system control processor (724) establishes a connection with the system control processor (714) via network (130). Once setup, the system control processor (724) notifies, at step 10, the system control processor (714) of the allocated storage resources of the storage unit (726).

In step 11, the system control processor (714) updates its maintained data structures based on the storage resources provided by storage unit (726). At step 12, the system control processor (714) presents, as bare metal resources, the storage resources from both the storage unit (716) and storage unit (726). Subsequently, the compute resource set A (712) discovers the resources and begins to use them as bare metal resources.

Turning to FIG. 7.2, at step 13, the compute resource set A (712) begins sending communications to the storage unit (726) hosted by information handling system B (720) to store data and access previously stored data. At step 14, the storage unit (726) services the data storage and access commands thereby generating and sending communications back to the compute resource set A (714).

To monitor the operational state of these devices, system control processor (714), at step 15, sets up monitoring services for these devices. Specifically, the system control processor (714) beings to (i) periodically sample communications between these devices at a relatively low rate and (ii) actively obtain health and operational state information from these devices.

Based on the aforementioned monitoring, the system control processor (714) identifies that compute resource set A (712) has sent the same storage request to storage unit (726) multiple times. The system control processor (714) identifies these repeated transmissions as an operation event and determines, using a remediation repository (not shown), that it should begin sampling the communications between these devices at a relatively high rate.

At step 16, the system control processor (714) begins sampling nearly all communications between these devices. Consequently, the system control processor (714) identifies a second operation event due to the high rate of sampling the communications. Specifically, the system control processor (714) identifies that a large fraction of all storage requests sent to the storage unit (726) are not being processed.

In response to this determination, at step 17, the system control processor (714) identifies that the control of the storage unit (726) should be reset in response to this operation event (e.g., as specified by the remediation repository). Consequently, the system control processor (714) sends a communication to the storage unit (726) indicating that its controller should restart.

In response to receiving this communication, at step 18, the storage unit (726) restarts its controller. After restarting its controller, the storage units (726) begins to processor storage requests normally resulting in most future storage requests being properly serviced.

End of Example

Thus, as illustrated in FIGS. 7.1-7.2, embodiments of the invention may provide an information handling system that automatically takes proactive action to obtain addition information that may be relevant for remediating its own operation.

Figure 8:
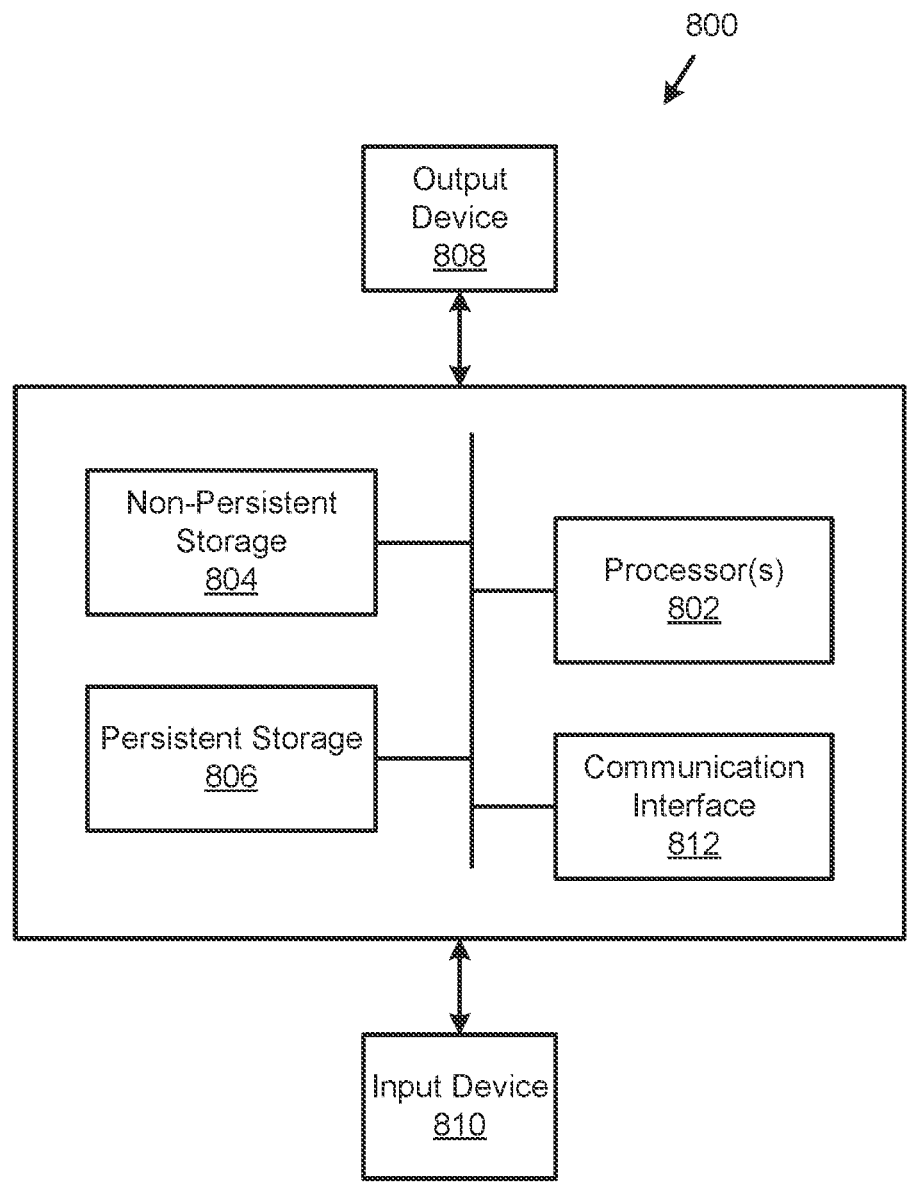
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for providing computer implemented services using information handling systems. Specifically, embodiments of the invention may provide information handling systems that may be composed into composed systems. These composed systems may each include at least one system control processor that monitors the operation of these devices in a manner that is transparent to the services being provided by the composed systems. If the system determines that a resource set component of an information handling system identifies an operation event, it may automatically take action to either obtain additional information usable to diagnose any issues with respect to the operation of the resource set component or automatically remediate the operation of the resource set component to place it into a predetermined operating state.

Thus, embodiments of the invention may address the problem of undesirable changes in the operation of a distributed system. For example, by automatically taking action to both better identify and remediate undesirable operating systems, embodiments of the invention may provide a system that is able to automatically correct undesirable operation of the system.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system for obtaining composed information handling systems, comprising:
   resource set components; and
   a system control processor, of a composed information handling system of the composed information handling systems, programmed to:
      make an identification, based on monitoring of a resource set component of the resource set components, of an operation event;
      in response to the identification:
         make a determination that the operation event is not immediately remediable based on the monitoring of the resource set component;
         in response to the determination:
            modify the monitoring of the resource set component to obtain refined operation data for the resource set component; and
            perform an action set, based on the refined operation data, to modify operation of the resource set component, wherein the action set comprises:

identifying a feature in the data flow indicative of a performance defect in the operation of the resource set component;

increasing a sampling rate of a data flow associated with the resource set component;

identifying a second feature in the data flow that was not detectable prior to increasing the sampling rate;

matching the second feature to a remediation action; and performing the remediation action by executing a configuration script to modify the operation of the resource set component.

2. The information handling system of claim 1, wherein the action set comprises:

increasing a sampling rate of a data flow associated with a second resource set component of the resource set components.

3. The information handling system of claim 1, wherein the action set comprises:

initiating sampling of a data flow associated with a second resource set component of the resource set components.

4. The information handling system of claim 1, wherein the action set comprises:

obtaining a sampling of a data flow associated with a resource set component monitored by a second system control processor of a second information handling system.

5. The information handling system of claim 1, wherein the data flow is sampled transparently to the resource set components.

6. The information handling system of claim 1, wherein the information handling system comprises:

a compute resource set comprising a first portion of the resource set components; and a hardware resource set comprising a second portion of the resource set components, wherein the system control processor interconnects the compute resource set and the hardware resource set.

7. The information handling system of claim 6, wherein the compute resource set views the hardware resource set as a bare metal resource.

8. A method for providing computer implemented services using composed information handling systems, comprising:

making an identification, based on monitoring of a resource set component of resource set components of an information handling system used to form at least one of the composed information handling systems, of an operation event;

in response to the identification:

making a determination that the operation event is not immediately remediable based on the monitoring of the resource set component;

in response to the determination:

modifying the monitoring of the resource set component to obtain refined operation data for the resource set component; and performing an action set based on the refined operation data to modify operation of the resource set component, wherein the action set comprises:

identifying a feature in the data flow indicative of a performance defect in the operation of the resource set component;

increasing a sampling rate of a data flow associated with the resource set component;

identifying a second feature in the data flow that was not detectable prior to increasing the sampling rate;

matching the second feature to a remediation action; and performing the remediation action by executing a configuration script to modify the operation of the resource set component.

9. The method of claim 8, wherein the action set comprises:

increasing a sampling rate of a data flow associated with a second resource set component of the resource set components.

10. A non-transitory computer readable medium comprising computer readable program code, which when executed by a computer processor enables the computer processor to perform a method for providing computer implemented services using composed information handling systems, the method comprising:

making an identification, based on monitoring of a resource set component of resource set components of an information handling system used to form at least one of the composed information handling systems, of an operation event;

in response to the identification:

making a determination that the operation event is not immediately remediable based on the monitoring of the resource set component;

in response to the determination:

modifying the monitoring of the resource set component to obtain refined operation data for the resource set component; and performing an action set based on the refined operation data to modify operation of the resource set component, wherein the action set comprises:

identifying a feature in the data flow indicative of a performance defect in the operation of the resource set component;

increasing a sampling rate of a data flow associated with the resource set component;

identifying a second feature in the data flow that was not detectable prior to increasing the sampling rate;

matching the second feature to a remediation action; and performing the remediation action by executing a configuration script to modify the operation of the resource set component.

11. The non-transitory computer readable medium of claim 10, wherein the action set comprises:

increasing a sampling rate of a data flow associated with a second resource set component of the resource set components.

* * * * *